(12) United States Patent
Fröström et al.

(10) Patent No.: US 6,561,827 B2
(45) Date of Patent: May 13, 2003

(54) APPARATUS FOR INTERCONNECTING MULTIPLE NODES

(75) Inventors: Tore Fröström, Stockholm (SE); Arne Asplund, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/740,144

(22) Filed: Dec. 18, 2000

(65) Prior Publication Data

US 2002/0076950 A1 Jun. 20, 2002

(51) Int. Cl.[7] ............................................... H01R 29/00
(52) U.S. Cl. ....................................... 439/188; 439/441
(58) Field of Search ............................... 439/676, 188, 439/532, 540, 716, 441; 379/327, 270–272

(56) References Cited

U.S. PATENT DOCUMENTS

| | | | |
|---|---|---|---|
| 4,096,359 A | 6/1978 | Barsellotti | 179/99 |
| 4,127,748 A | 11/1978 | Gillemot | 179/98 |
| 4,955,686 A * | 9/1990 | Buhrer et al. | 350/96.2 |
| 5,129,842 A * | 7/1992 | Morgan et al. | 439/532 |
| 5,265,156 A | 11/1993 | Eason et al. | 379/327 |
| 5,438,617 A | 8/1995 | Hill et al. | 379/327 |
| 5,599,191 A | 2/1997 | DeLara | 439/49 |
| 5,997,311 A | 12/1999 | Crouse et al. | 439/49 |
| 6,243,510 B1 * | 6/2001 | Rauch | 385/15 |

FOREIGN PATENT DOCUMENTS

| | | |
|---|---|---|
| EP | 106258 US | 7/2001 |
| JP | 6260235 | 9/1994 |
| WO | WO 00/76224 | 12/2000 |

OTHER PUBLICATIONS

Casuistic Enhancement Subsystem, IBM Technical Disclosure Bulletin, Apr. 1979.*

* cited by examiner

Primary Examiner—Jean F. Duverne
(74) Attorney, Agent, or Firm—Jenkens & Gilchrist, P.C.

(57) ABSTRACT

The present invention describes a patch panel unit including an interface for connecting the patch panel with an electrical node and first and second ports for receiving patch cord connectors. A switch interconnects the first interface with the first and second ports such than when a connector is placed only within the first port, an active connection is provided between the interface and the first port. When a connection is placed within the second port, an active connection is provided between the second port and the first interface despite whether a connection is provided with the first port.

33 Claims, 4 Drawing Sheets

APPARATUS FOR INTERCONNECTING MULTIPLE NODES

TECHNICAL FIELD

The present invention relates to cross-connection systems, and more particularly, to an apparatus for providing both semi-permanent and temporary connections between electrical nodes.

BACKGROUND OF THE INVENTION

Existing cross-connection systems available on the market today are designed for live communication systems. The cross-connection systems include permanent wirewrap connections for different routes between transmission nodes according to a routing plan. If a fault occurs along a particular route, a new route may be established by a temporary patch cord for interconnecting two nodes. More permanent routing would then have to be implemented using a fixed wirewrap.

In certain situations, such as a test plant for a telecommunication system, this type of cross-connection is unacceptable. A test plant normally runs a great number of different test cases for a limited period of time. This requires a need for an easy and quick setup of different routes between nodes of a telecommunications network. Within existing cross-connection systems, it is required to utilize two patch cords on, e.g., the front side panel of a cross-connection cabinet for each two-way communication route. Due to the great number of patch cords it is many times difficult and time consuming to locate and connect or disconnect new patch cords to test a new route. This creates a very jumbled mass of patch cords on the panels of the cross-connect system. Thus, an improved cross-connect system enabling testing of various pathways between transmission nodes to more easily be implemented is desired.

SUMMARY OF THE INVENTION

The present invention overcomes the foregoing and other problems with a patch panel unit that includes a first interface enabling connection of the patch panel unit with a transmission node, such as an electrical or optical node for telecommunication. A switch interconnects the interface with first and second ports. The first and second ports are provided for receiving respective first and second patch cord connectors. The switch is configured to be in a first position as a default when no connection is provided in the second port. The switch is further configured to a second position when a second patch cord connector is placed within the second port thereby temporarily interconnecting the second port with another patch panel unit. A plurality of patch panel units may be provided together within a single cross-connect system to enable interconnections between a number of nodes.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
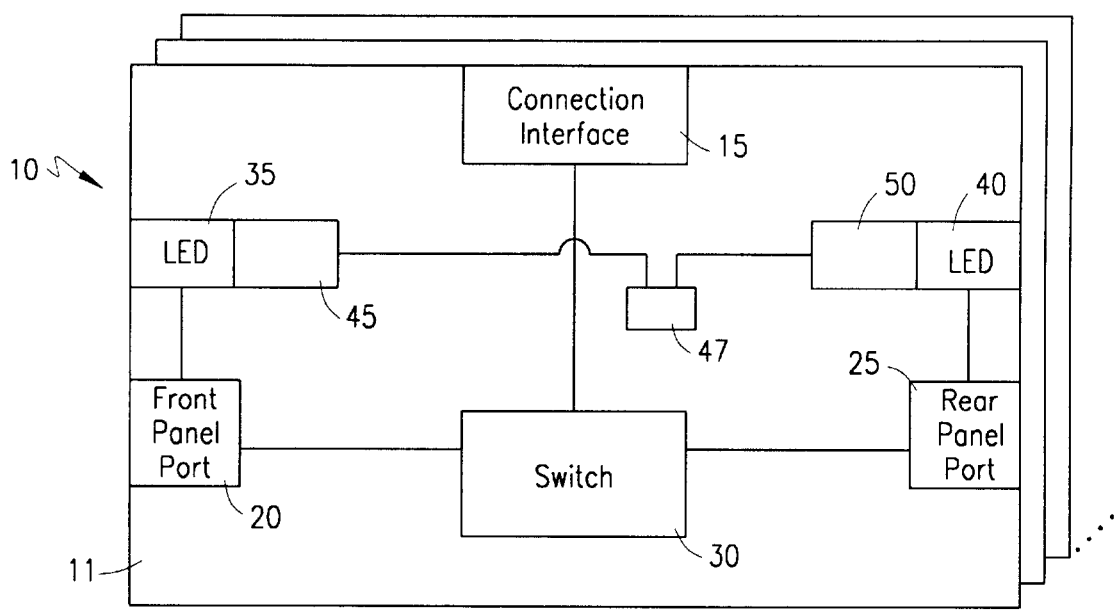
FIG. 1 is a functional block diagram of a patch panel in the cross-connection system of the present invention.

Referring now to the drawings, and more particularly to FIG. 1, there is illustrated the patch panel 10 of the present invention. While FIG. 1 and the description with respect thereto illustrates only a single patch panel unit 11 having an associated front panel interface 20 and rear panel interface 25, the patch panel 10 of the present invention may include multiple patch panel units 11 each comprising a connection interface 15, front panel port 20 and rear panel port 25 to form a cross-connect system.

The patch panel unit 11 illustrated in FIG. 1 includes a connection interface 15 for connecting the patch panel with an external node (not shown). The external node may comprise any type of a transmission node, but in the preferred embodiment consists of a telecommunication node within a wireline or wireless telecommunications network. The connection interface 15 is configured to receive an input transmission line (not shown) from the external node. The connections to the connection interface 15 may consist of wires, trunks, PCM links, optical fibers or any other type of wireline connection. The connection interface 15 is coupled to a corresponding pair of panel ports such as a front panel port 20 and a rear panel port 25 in the patch panel unit 11. The front panel port 20 and rear panel port 25 are each configured to receive a patch cord connector. The connection interface 15 is selectively interconnected with either a front panel port 20 and a rear panel port 25 via a switch 30.

The switch 30 consists of any type of hardware or software switching functionality enabling both the front panel port 20 or the rear panel port 25 to interconnect with the connection interface 15. In this example, the switch 30 has a default configuration such that when a connection is provided via only the rear panel port 25 and the front panel port 20 is not connected to anything, the rear panel port 25 is interconnected with the connection interface 15. When a connection is provided via the front panel port 20 to another patch panel unit 11, this connection will override any existing connection to the rear panel port 25 causing the front panel port 20 to be interconnected with the connection interface 15 and the rear panel port 25 is disconnected. Thus, if connections are applied to both the front panel port 20 and the rear panel port 25, the front panel port is active. The rear panel port 25 and the connection associated therewith remain inactive until the connection via the front panel port 20 is removed. It should be understood that the front port 20 and the back port 25 could just as well be located at any other parts of the panel, such as left side and right side or top and bottom. Also, a connection to the back port could instead override a front port connection depending on how the switch is configured.

Associated with each of the patch panel units 11 are LEDs 35 and 40, respectively. Other types of connection indicating means may also be used. The LEDs 35, 40 may be located on the front panel, the back panel or both. In one embodiment, the front panel LED 35 comprises a red LED and the rear panel LED 40 comprises a green LED. When the LEDs 35 and 40 are unlit, this provides an indication that there are no active connections to and from the associated port. When a connection is placed by a patch cord or the like within the front panel port 20 or rear panel port 25, the associated LED becomes lit indicating an active connection with the port. The LEDs 35, 40 also have associated therewith circuitry 45, 50, which will be more fully discussed below, responsive to an actuator such as a handheld magnet applied to an actuation point 47 associated with LEDs 35, 40. When the magnet is applied to the actuation point 47, the circuitry 45 or 50 closes, and the associated LED twinkles or blinks at the connection point associated with that LED, and the LED associated with the connection point where the other end of the patch cord is placed. In this way, the two ends of a connection route are indicated. Of course, there are numerous other possible ways of indicating the connection route, such as a different color or brightness.

Figure 2A:
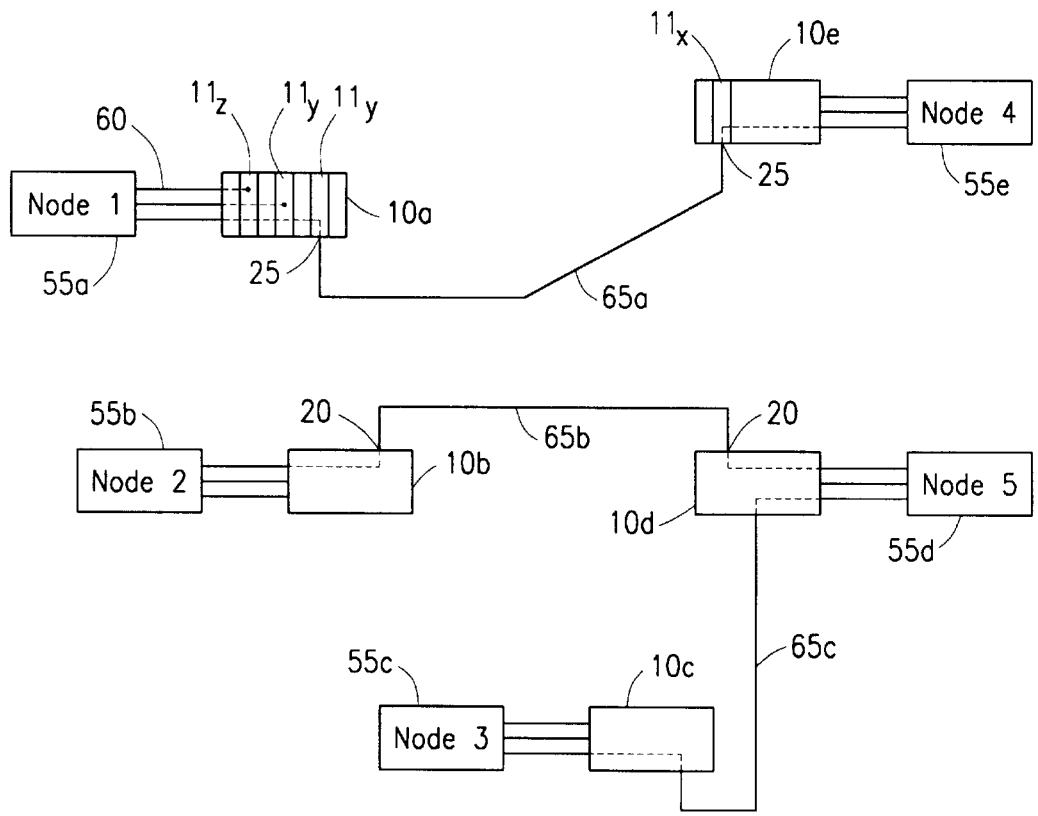
FIGS. 2a through 2d illustrate the use of a patch panel for interconnecting various nodes of a telecommunication system.

Referring now to FIG. 2a, there is illustrated an exemplary communications network comprising five different nodes 55. Each of the nodes 55 is connected to an associated patch panel 10 by one or more connection lines 60 which each interface with a connection interface 15 as described previously with respect to FIG. 1. It is shown in FIG. 2a that each of the connection lines 60 is connected to an individual patch panel unit 11x, 11y, 11z. Each of the connection lines 60 is further coupled to a corresponding pair of a front panel port 20 and rear panel port 25 via the connection interface 15 and the switch 30. Each of the connection lines 60 of any node 55 may connect to any other node 55 by interconnecting the corresponding port 20 or 25 with another port 20 or 25 on a patch panel unit 11 associated with the other node 55 by means of a cross-connecting patch cord 65.

FIG. 2a illustrates three exemplary patch cord connections 65a through 65c between various nodes 55a through 55e. Node 1 includes a semi-permanent active connection to node 4 using patch cord 65a. Node 2 has a temporary active connection to node 5 by patch cord 65b. Finally, Node 3 has a semi-permanent active connection to node 5 using patch cord 65c. Reference to a connection as a semi-permanent or temporary connection depends upon whether the connection is between the back panels of the patch panel 10 (i.e., rear panel ports 25) or the front panels of the patch panel 10 (i.e., front panel ports 20). A connection between the rear panels of two patch panel units 11 is referred to as semi-permanent connection. Temporary connections are made between front panels of a pair of patch panels 10, thereby overriding any existing semi-permanent connections on the corresponding back panels.

Figure 2B:
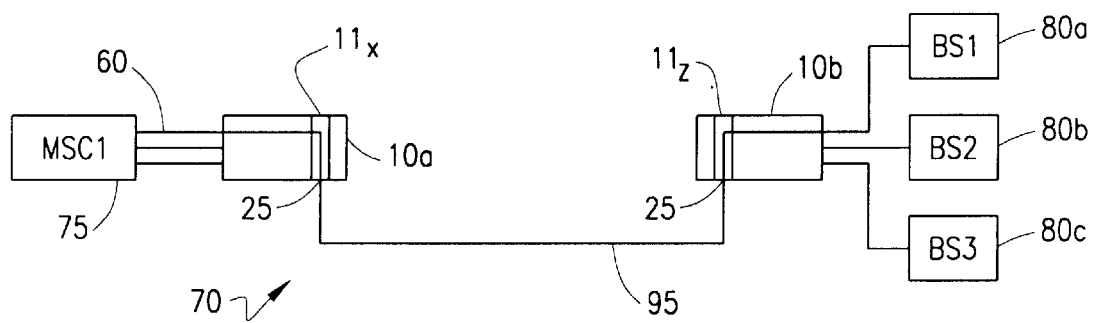
Figure 2C:
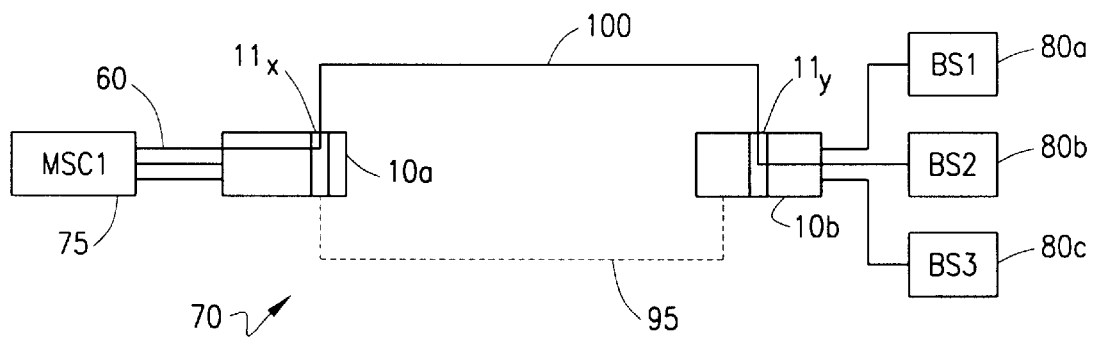
Figure 2D:
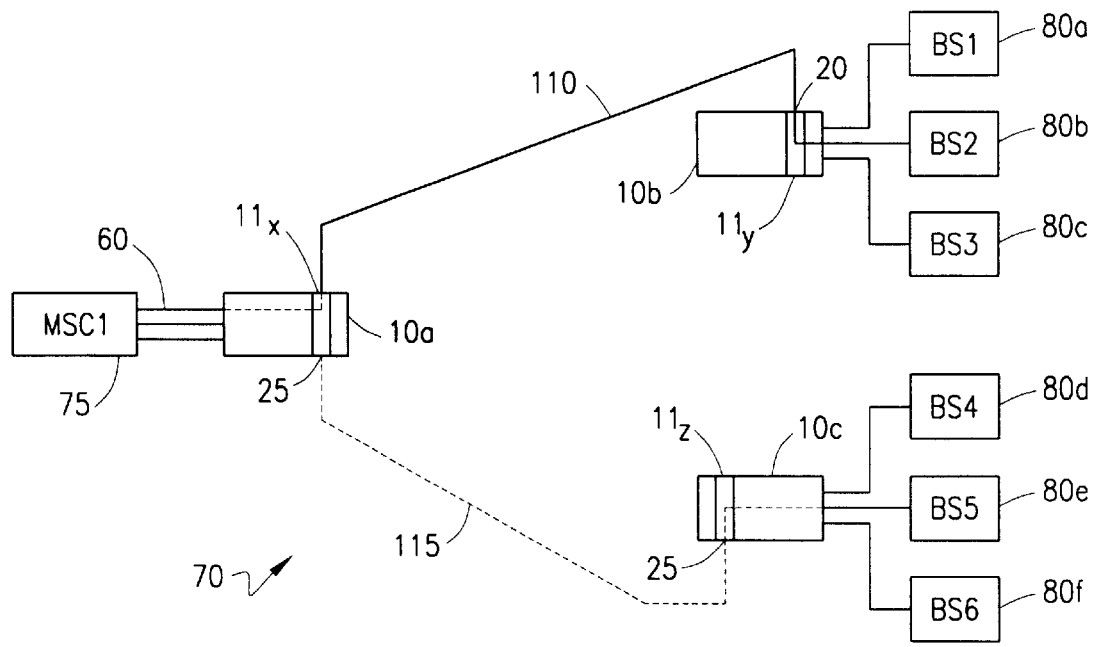

Referring now to FIGS. 2b–2d, there are illustrated an exemplary radio communication system utilizing the patch panels 10 of the present invention. As described previously with respect to FIG. 1, the nodes, which are interconnected by the patch panels 10 may comprise any type of transmission node. However, in the embodiments described in FIGS. 2b–2d, different examples of using patch panels to specifically interconnect telecommunications nodes are described.

The exemplary radio communications system 70 of FIGS. 2b–2d comprises a mobile switching center (MSC) 75 and base stations (BS) 80. The MSC 75 is associated with a first patch panel 10a providing connection lines 60 from the MSC 75 to the corresponding patch panel unit 11, and the base stations 80 interconnect with second and third patch panel 10b, 10c. In FIGS. 2b and 2c, a patch cord 95 interconnects the back port 25 of patch panel unit 11x at patch panel 10a with the back port 25 of patch panel unit 11z at patch panel 10b. Line 60 of MSC 75 is thus in FIG. 2b connected with base station 80a which is associated with patch panel 10b via patch panel unit 11z. Since the connection is made at the back port 25 of both patch panels 10a and 10b, the connection is a semi-permanent one. Other transmission paths from the MSC may be made in a similar manner to other base stations.

FIG. 2c illustrates the same radio communications network 70 including the MSC 75, base stations 80a–80c and patch panels 10a, 10b. In this case, a temporary patch cord 100 interconnects the front port 20 of panel unit 11x with the front port 20 of panel unit 11y. This provides a connection between the MSC 75 and base station 80b which is associated with patch panel unit 11y at patch panel 10b. This establishes a temporary connection that overrides the semi-permanent connection 95 between the back ports of patch panel 10a and 10b since switch 30 in patch panel unit 11x is in a second position as described above. In this way, Line 60 of MSC 75 is re-routed to base station 80b instead of base station 80a.

In FIG. 2d, each of the patch panels 10b and 10c have three base stations 80 interconnected therewith. A temporary patch cord 110 from front port 20 of unit 11x at panel 10a to front port 20 of unit 11y at patch panel 10b provides a temporary connection between line 60 of MSC 75 and base station 80b overriding the semi-permanent connection provided by patch cord 115 between the back port 25 of unit 11x at patch panel 10a and the back port 25 of unit 11z at patch panel 10c to base station 80e.

Figure 3:
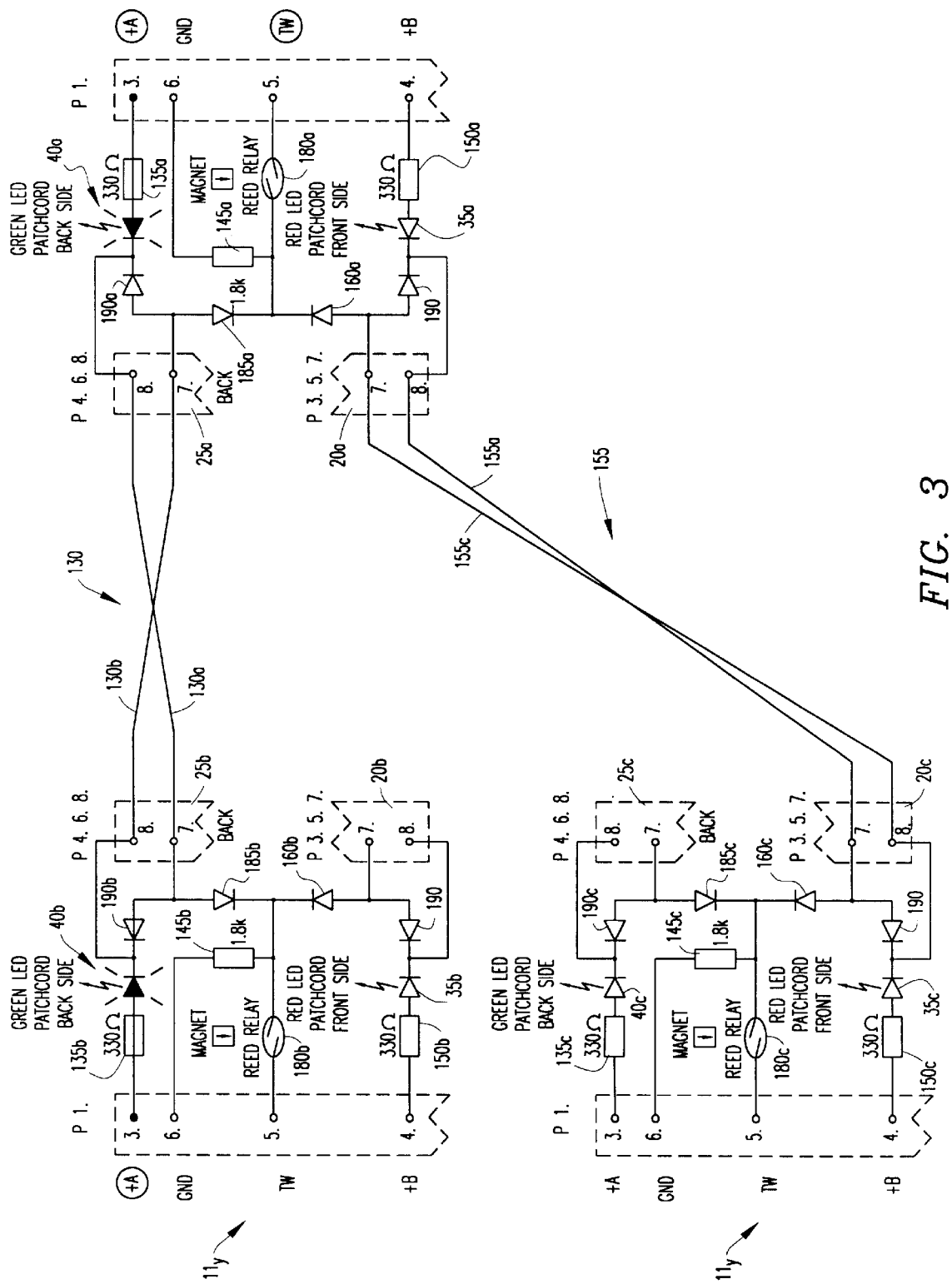
FIG. 3 illustrates the manner in which LEDs indicate endpoints of connected nodes.

Referring now to FIG. 3, there is illustrated the front and the back panel LEDs 35, 40 and associated circuitry 45 and 50 of FIG. 1 for providing an indication of whether a port is actively connected with a node. A description of the LEDs and associated circuitry will now be made with respect to patch panel unit 11x. The circuitry for the remainder of the patch panel units is identical.

Terminals 7 and 8 comprise each of the front and back panel ports for the patch panel unit 11. Terminal 3 provides a connection to a first voltage source +A, terminal 6 is connected to ground, terminal 5 is connected to a pulsating voltage level means TW and terminal 4 connects to a second voltage source +B. When the back panel ports 25a and 25b of two nodes are interconnected using a patch cord 130 containing two conductors 130a, 130b, terminal 3 of patch panel unit 11x is interconnected with terminal 6 of patch panel unit 11y and vice versa. The current flows from the voltage source +A of patch panel unit 11x through the series connection of resistor 135a, LED 40a, patch cord conductor 130a, diode 185b, and resistor 145b to the ground of terminal 6. The pathway is the same in both directions. This provides a steady illumination of the green LEDs 40a and 40b on the back panels of patch panel unit 11x and 11y indicating a semi-permanent connection.

Likewise, when a patch cord 155 is used to interconnect the front ports 20a and 20c of patch panel unit 11x and 11z, current flows from terminal 4 (voltage source +B) to terminal 6 (ground) in each direction. From the voltage source +B in patch panel unit 11x current flows through resistor 150a and LED 35a out terminal 8 to patch cord conductor 155a. The current flow next passes back into the other patch panel unit 11z via terminal 7 through diode 160c and resistor 145c to the ground terminal 6. The current pathway is similar from the voltage source +B of patch panel unit 11z to the ground of patch panel unit 11x. This causes steady illumination of the red LEDs 35 on the front panels of the patch panel unit 11x and 11z indicating a temporary connection.

By applying an actuator device, such as a magnet, to the actuation point (not shown) at patch panel unit 11x, each end of a connection may be determined by a blinking or twinkling effect which is provided by the LEDs. In the case of determining the ends of the semi-permanent connection between the back panels of panel units at patch panel unit 11x and patch panel unit 11z, placement of a magnet to the actuation point at patch panel unit 11*x* causes a switch 180*a* to close interconnecting pulsating voltage level means TW into the circuit. The switch 180*a* in this example is implemented as a magnet controlled reed relay switch 180*a*. Other types of switches may be used for closing the circuit, such as a mechanical switch. In this example, placement of a magnet to the actuation point of patch panel unit 11*x* will thus close two sub-circuits. One sub-circuit between voltage source +A of patch panel unit 11*y* and the pulsating voltage level means TW of patch panel unit 11*x*. The other sub-circuit is between voltage source +A of patch panel unit 11*x* and the pulsating voltage level means TW of patch panel unit 11*x*. The one sub-circuit consists of resistor 135*b*, LED 40*b*, patch cord conductor 130*b*, diode 185*a* and switch 180*a*. The other sub-circuit consists of resistor 135*a*, LED 40*a*, patch cord conductor 130*a*, diode 190*b*, back again to patch cord conductor 130*b*, diode 185*a* and finally reed relay switch 180*a*. This provides a blinking or twinkling effect for green LEDs 40*a* and 40*b* at both sides, even though the magnet is applied at only one side.

A similar connection is formed when a magnet is placed next to the actuation pont at patch panel unit 11*x* for a temporary connection between patch panel unit 11*x* and patch panel unit 11*z*. In this case, a blinking or twinkling effect is provided for red LEDs 35*a* and 35*c*.

Figure 4:
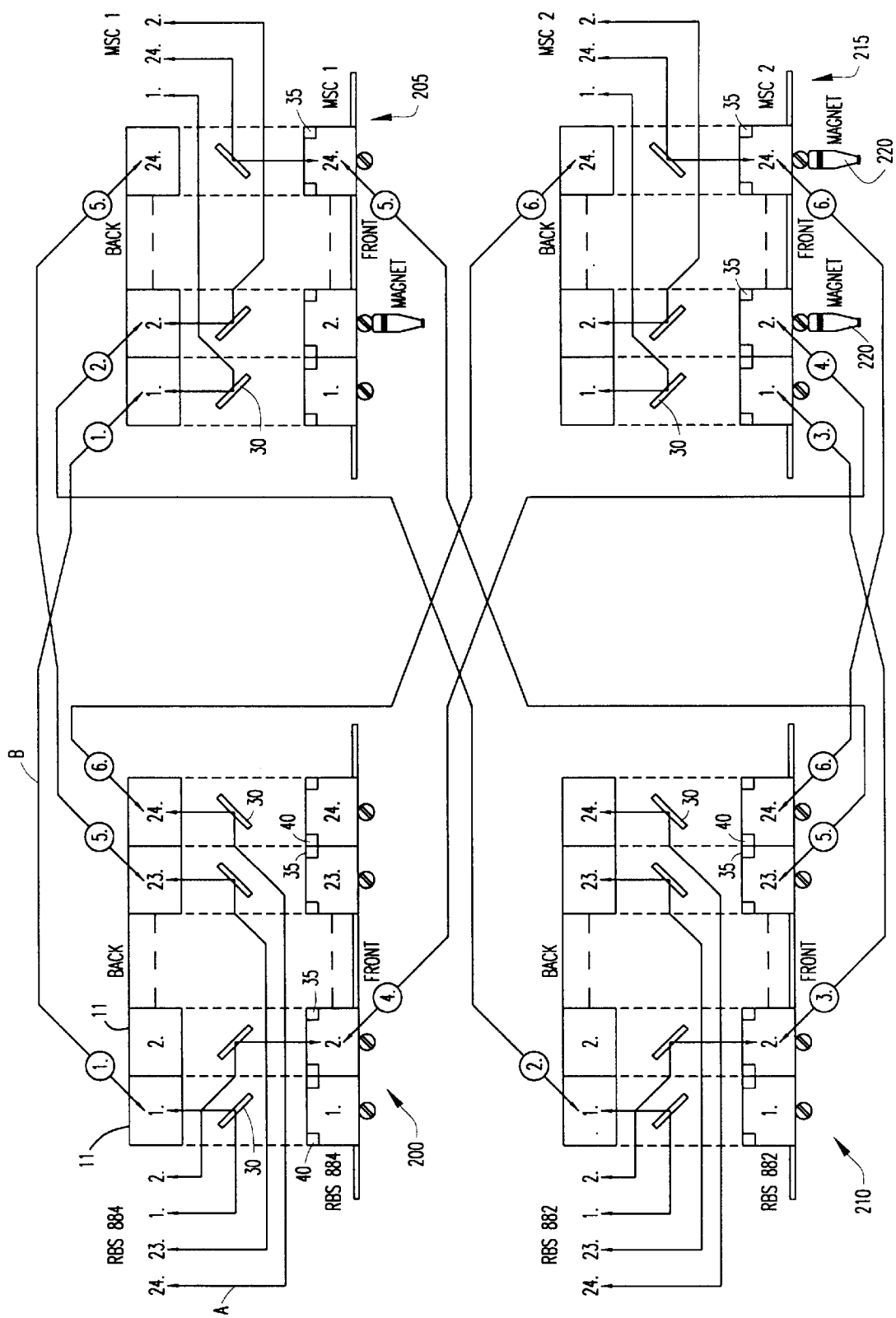
FIG. 4 provides an illustration of the LED indication functionality of the cross-connection system of the present invention.

FIG. 4 illustrates a cross-connection system including numerous patch panel units 11 as described with respect to FIG. 1. The figure illustrates six connection cases between two base stations, RBS 884 and RBS 882, and two mobile switching centers, MSC 1 and MSC 2. FIG. 4 illustrates only the associated patch panels 200, 205, 210 and 215 and their connections, not the interconnecting nodes themselves. Connection lines A 1–24 from each node are coupled to associated pairs of ports 1/1, 2/2, . . . 24/24 in the patch panel 200, 205, 210 and 215. Each connection line connects selectively to one of two ports by a switch 30, as described with respect to FIG. 1, located by each port pair between each back panel and the corresponding front panel. Further, both green and red LEDs are situated on the panel front for easy access. Only connection cases 1 and 4–6 are described below.

Case 1: According to the illustrated connection pathways, patch panel unit 1 of patch panel 200 displays a green LED 40 due to the back port connection between patch panel unit 1 of panel 200 and patch panel unit 1 of panel block 205. A green LED 40 is also displayed at panel unit 1 of patch panel 205.

Case 4: Patch panel unit 2 of panel 200 and patch panel unit 2 of panel 215 display blinking red LEDs 35 due to the front panel connection between patch panel unit 2 of panel 200 and patch panel unit 2 of panel 215 and the applied magnet 220.

Case 5: A red LED 35 indication is provided on patch panel unit 23 of panel 210 and patch panel unit 24 of block 205 due to the front panel connection between these two patch panels. This temporary front connection overrides a semi-permanent back connection between unit 23 of panel 200 and unit 24 of panel 205.

Case 6: The semi-permanent back connection from unit 24 of panel 200 to unit 24 of panel 215 is disconnected by the patch cord from front of unit 24 of panel 210 to front of unit 24 of panel 215. Therefore, red LEDs 35 twinkle at both ends.

The previous description is of a preferred embodiment for implementing the invention, and the scope of the invention should not necessarily be limited by this description. The scope of the present invention is instead defined by the following claims.

What is claimed is:

1. A patch panel unit, comprising:
   a first interface for connecting the patch panel to a transmission node;
   a first port for receiving a first patch cord connector;
   a second port for receiving a second patch cord connector; and
   a switch selectively interconnecting the first interface with either of the first port and the second port, the switch having a first position interconnecting the first port to the first interface responsive to connection of the first patch cord connector to the first port and no connection to the second port, the switch having a second position interconnecting the second port to the first interface responsive to connection of the second patch cord connector to the second port.

2. The patch panel unit of claim 1, further including:
   a first indicator for indicating a connection of the first port; and
   a second indicator for indicating a connection of the second port.

3. The patch panel unit of claim 2, wherein said first and second indicators are LEDs.

4. The patch panel unit of claim 3, wherein the first LED emits a first color light and the second LED emits a second color light.

5. The patch panel unit of claim 3, further including first circuitry associated with each of the first and second LEDs, said first circuitry enabling an associated LED to provide a first indication responsive to a connection of the first and second patch cord connector, respectively.

6. The patch panel unit of claim 5, further including second circuitry associated with each of the first and second LEDs, said second circuitry enabling an associated LED to provide a second indication responsive to an actuator.

7. The patch panel unit of claim 6, wherein the second circuitry associated with each of the first and second LEDs causes an associated LED to blink responsive to said actuator being applied to an actuation point associated with the second circuitry.

8. The patch panel unit of claim 1, wherein the first port is located on a rear panel and the second port is located on a front panel.

9. The patch panel unit of claim 1, wherein the transmission node comprises a telecommunication node.

10. The patch panel unit of claim 1, wherein the transmission node comprises an electrical node.

11. The patch panel unit of claim 1, wherein the transmission node comprises an optical node.

12. The patch panel unit of claim 1, wherein said connections are active connections.

13. The cross-connection system of claim 12, further including:
   a first indicator for indicating a connection to the first port; and
   a second indicator for indicating a connection to the second port.

14. The cross-connection system of claim 13, wherein said first and second indicators are LEDs.

15. The cross-connection system of claim 14, wherein the first LED emits a first color light and the second LED emits a second color light.

16. The cross-connection system of claim 14, further including first circuitry associated with each of the first and second LEDs, said first circuitry enabling an associated LED to provide a first indication responsive to a connection of the first and second patch cord connector, respectively.

17. The system of claim 16, wherein said first circuitry includes a first voltage source and said first indication is based on the first voltage source.

18. The system of claim 17, wherein said first voltage source provides a constant voltage level.

19. The cross-connection system of claim 16, further including a second circuitry associated with each of the first and second LEDs, said second circuitry enabling an associated LED to provide a second indication responsive to an actuator.

20. The cross-connection system of claim 19, wherein said second circuitry includes a second voltage source and second indication is based on the second voltage source.

21. The cross-connection system of claim 20, wherein said second voltage source provides a pulsating voltage level.

22. The cross-connection system of claim 19, wherein the circuitry associated with each of the first and second LEDs causes an associated LED to blink responsive to said actuator in close proximity to the circuitry being applied to an actuation point.

23. The cross-connection system of claim 22, wherein said second circuitry further includes a switch operating to close the second circuitry when said actuator is applied to the actuation point.

24. The cross-connection system of claim 22, wherein said actuator is a hand-held magnet.

25. The cross-connection system of claim 24, wherein said actuation point includes a magnet controlled switch.

26. A cross-connection system comprising:
- a plurality of patch panel units enabling interconnection of a plurality of transmission nodes, each of said plurality of patch panel units comprising:
  - a first interface for connecting the patch panel unit to a transmission node;
  - a first port for receiving a first patch cord connector;
  - a second port for receiving a second patch cord connector; and
  - a switch selectively interconnecting the first interface with either of the first port and the second port, the switch having a first position interconnecting the first port to the first interface responsive to connection of the first patch cord connector to the first port and no connection to the second port, the switch having a second position interconnecting the second port to the first interface responsive to connection of the second patch cord connector to the second port.

27. The cross-connection system of claim 26, wherein the first port is located on a rear panel and the second port is located on a front panel.

28. The cross-connection system of claim 26, wherein the transmission node comprises a telecommunication node.

29. The cross-connection system of claim 26, wherein a connection by the first patch cord between a first port of a first patch unit and a first port of a second patch panel unit comprises a semi-permanent connection and wherein the switch in each of first and second panel units is in said first position.

30. The cross-connection system of claim 26, wherein a connection by the second patch cord between a second port of a first patch panel unit and a second port of a second patch panel unit comprises a temporary connection and wherein the switch in each of first and second panel units is in said second position.

31. The system of claim 30, wherein the temporary connection between said second ports overrides any semi-permanent connection from the corresponding first ports.

32. The patch panel unit of claim 26, wherein said connections are active connections.

33. A patch panel unit, comprising:
- a first interface for connecting the patch panel unit to a transmission node;
- a first port for receiving a first patch cord connector;
- a second port for receiving a second patch cord connector;
- a switch selectively interconnecting the first interface with either of the first port and the second port, the switch having a first position interconnecting the first port to the first interface responsive to connection of the first patch cord connector to the first port and no connection to the second port, the switch having a second position interconnecting the second port to the first interface responsive to connection of the second patch cord connector to the second port;
- a first indicator for indicating a connection of the first patch cord connector to the first port;
- a second indicator for indicating a connection of the second patch cord connector to the second port; and
- circuitry associated with each of the first and second indicators, said circuitry enabling an associated indicators to provide a first indication responsive to a connection of the first cord connector or the second patch cord connector and to provide a second indication responsive to an actuator.

* * * * *